O. JUNGGREN.
THRUST BEARING.
APPLICATION FILED JUNE 5, 1917.

1,284,701.

Patented Nov. 12, 1918.
2 SHEETS—SHEET 1.

Inventor:
Oscar Junggren,
by Albert G. Davis
His Attorney.

O. JUNGGREN.
THRUST BEARING.
APPLICATION FILED JUNE 5, 1917.

1,284,701.

Patented Nov. 12, 1918.
2 SHEETS—SHEET 2.

Inventor:
Oscar Junggren,
by
His Attorney

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

THRUST-BEARING.

1,284,701.  Specification of Letters Patent.  Patented Nov. 12, 1918.

Application filed June 5, 1917. Serial No. 173,026.

*To all whom it may concern:*

Be it known that I, OSCAR JUNGGREN, a citizen of the United States, residing at Schenectady, county of Schenectady, State of New York, have invented certain new and useful Improvements in Thrust-Bearings, of which the following is a specification.

The present invention relates to thrust bearings, such as are used, for example, in connection with elastic-fluid turbines and like machines, and has for its object to provide an improved thrust bearing which is simple in structure and can be readily adjusted in all directions to bring it into proper alinement and position.

For a consideration of what I believe to be novel and my invention, attention is directed to the accompanying specification and the claims appended thereto.

Figure 1:
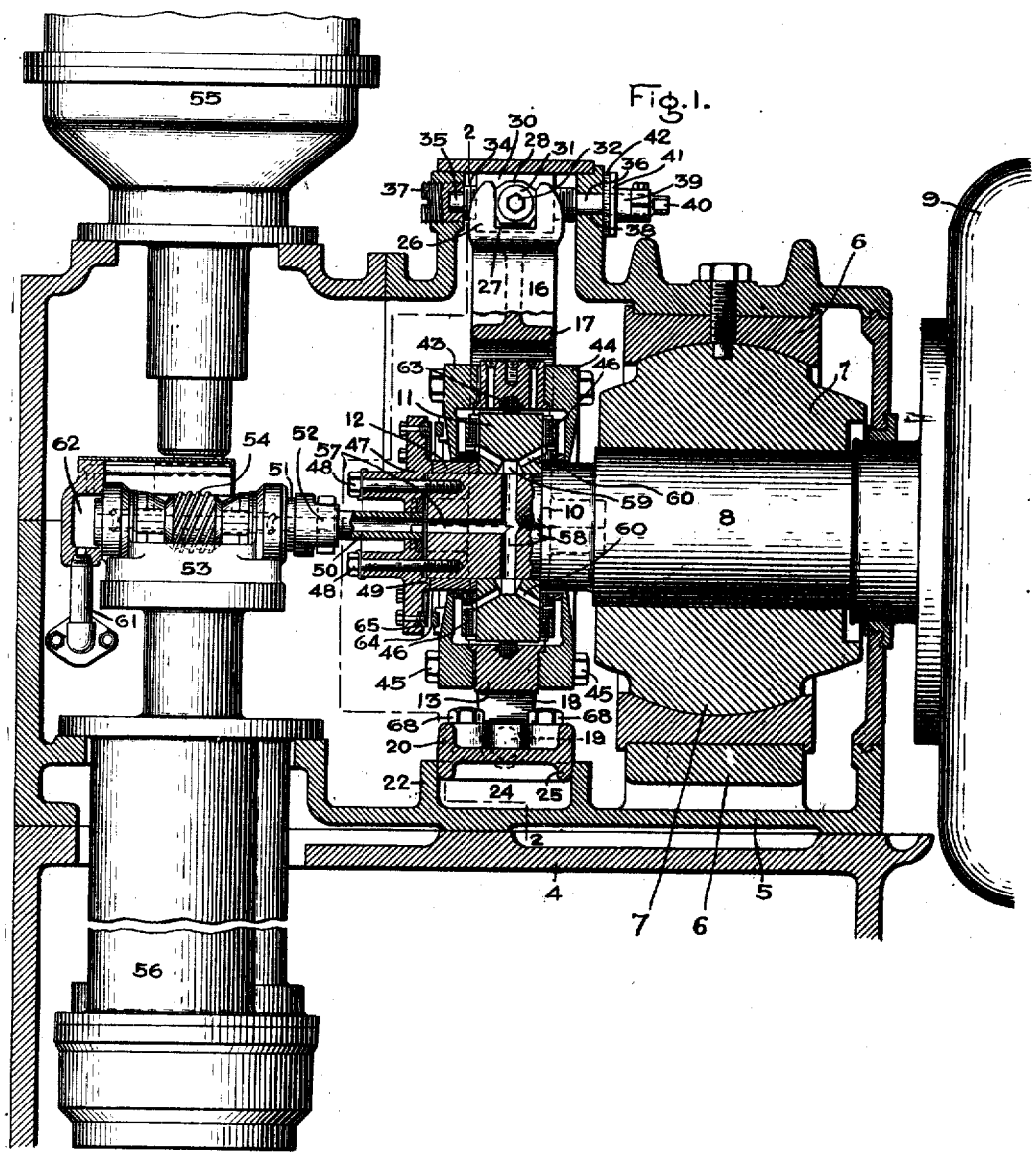
Figure 2:
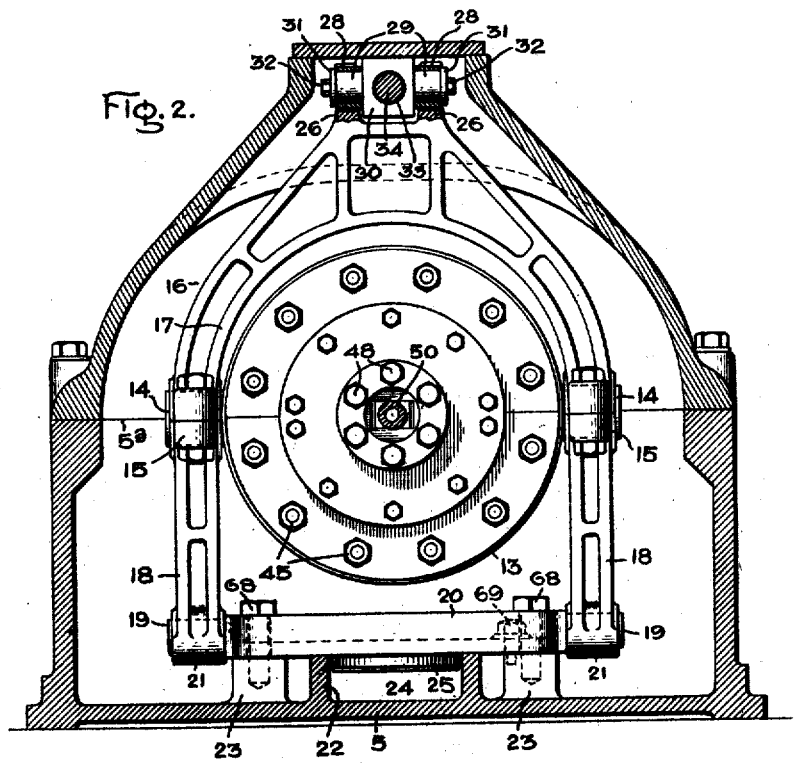
Figure 3:
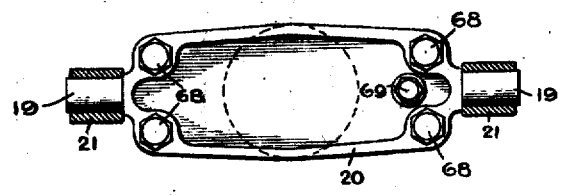

In the drawing, Figure 1 is a vertical longitudinal sectional view of a thrust bearing embodying my invention; Fig. 2 is a section taken on line 2—2, Fig. 1, and Fig. 3 is a plan view of one of the parts.

Referring to the drawing, 4 indicates a base or support upon which is mounted a casing 5 supporting a bearing bracket 6 which carries a bearing 7 for a shaft 8 which may be the shaft of an elastic-fluid turbine. The casing 5 is split horizontally as indicated at 5ª so that the upper half may be removed. 9 indicates, in the present instance, a portion of the end of a turbine casing at the point where the shaft passes through it, and it will be understood that in the portion of the casing shown surrounding the shaft is a suitable packing to prevent leakage around the shaft. The shaft 8 beyond the outer edge of the bearing 7 is reduced in diameter to form a shoulder 10, and engaging this shoulder 10 is a thrust collar 11 suitably keyed to the shaft, and held against the shoulder 10 by a spacing ring 12. Surrounding the thrust collar 11 is an annular ring 13 provided with trunnions 14 located in the horizontal plane of the axis of shaft 8 and carried in bearings 15 in a supporting frame 16. The supporting frame 16 is divided horizontally on the axis of the bearings 15 and comprises an upper section 17 of horseshoe shape, in the two arms of which are formed the upper halves of bearings 15, and a lower section comprising two arms 18 which carry the lower halves of bearings 15 on their upper ends and are pivoted at their lower ends on trunnions 19 carried by a cross plate 20. The arms 18 have suitable eyes 21 which fit over the trunnions 19. The cross plate 20 is supported on bosses 22 and 23 having flat machined faces, and the boss 22 has a central opening 24 forming a guide in which slides a projection 25 on the lower side of the cross plate 20. The upper section 17, together with the two arms 18, form a U-shaped member pivoted on cross plate 20. The upper section 17 of the frame 16 has on its top a pair of spaced fingers 26 which are slotted at 27 to receive rectangular sleeves 28 carried by trunnions 29 projecting from opposite sides of a rectangular block 30. The sleeves 28 are held in place by washers 31 held by bolts 32. The block 30 has a threaded opening 33 through it which extends at right angles to and in the same horizontal plane as the trunnions 29. In the threaded opening 33 is a screw-threaded rod 34 having ends 35 and 36 of reduced diameter. The end 35 is carried in a socket in the end of a short screw 37 which threads into an opening in the casing 5 and the end 36 extends through an opening 38 in casing 5. By turning up the screw 37 the rod 34 can be clamped firmly against turning, being held between the screw 37 and the side of the casing. On the end 36 of rod 34 is fastened a collar 39 having a squared end 40 to receive a wrench for turning the rod 34 and a flange 41 which coöperates with a disk 42 on the casing 5 to form a suitable measuring or indicating mechanism to guide the operator in adjusting the bearing as is referred to hereinafter. The showing of the measuring or indicating mechanism is only diagrammatic, it being understood that any suitable arrangement may be used. The rod 34 cannot move longitudinally so, when it is turned, the block 30 will be forced along the rod as is obvious.

Carried by the angular ring 13 which surrounds the thrust collar 11 are the annular thrust bearing plates 43 and 44. They are fastened to the ring 13, one on each side, by bolts 45, and have faces 46 of suitable bearing material, as Babbitt, which are adapted to be engaged by the thrust collar 11. The thrust bearing plates 43 and 44 are preferably made in two parts being split in the same plane as is the casing 5 and bearing 15.

On the end of the shaft 8 is a plate 47 fastened in place by bolts 48, the plate having an annular projection 49 which fits over the end of the shaft 8 to center the plate and engages the spacing ring 12. Carried by the center of the plate 47 is a short hollow shaft 50 which is connected to a second short hollow shaft 51 by a jaw coupling 52. The shaft 51 is journaled in a bearing bracket 53 and carries a worm 54 which drives a centrifugal speed governor 55 and one or more gear pumps 56 which pump lubricant to the various bearings. The detail structure of the speed governor 55 and gear pump or pumps 56 is not illustrated as their specific structures form no part of the present invention. It will be understood that any suitable arrangement may be used.

Referring now to the lubrication of the thrust bearing, the end of shaft 8 is provided with an axially extending hole 57, the inner end of which opens into a hole 58 extending diametrically through the shaft. The two ends of hole 58 communicate with an annular groove 59 in the thrust collar 11, and connecting with the groove 59 are a series of openings 60 drilled diagonally through the side of the thrust collar 11 and suitably spaced around the shaft. Lubricant from the pump or pumps 56 flows by way of a pipe 61 to a chamber 62 at the end of hollow shaft 49, thence through hollow shaft 51, hollow shaft 50, holes 57 and 58 in the shaft 8 to annular groove 59, from which it passes through the series of openings 60 to the thrust bearing surfaces. It will be noted that the inner surface of the annular ring 13 is spaced slightly from the outer surface of the thrust collar 11, and located centrally between the two is a narrow bearing ring 63 which is carried by the ring 13. This bearing ring 63 serves to make the lubricating passages for each of the thrust bearing surfaces separate and distinct. Without such a ring there is a tendency for the lubricant to follow the path of least resistance and flow to the bearing surfaces which at the time are not in contact and away from those which are, the latter surfaces being those where the lubricant is most needed.

Carried by the adjacent surfaces of the thrust bearing plate 43 and plate 47 are rings 64 and 65 having their adjacent surfaces but slightly spaced apart. The purpose of these rings is to form an indicating device. It will be noted that the one 65 revolves with the shaft and that the other 64 is stationary. If, for any reason, the shaft should shift sufficiently to bring ring 65 into engagement with ring 64, the rubbing of the one on the other will set up a noise which will attract attention to the machine of which the bearing forms a part.

Referring now to the assembling and adjustment of the thrust bearing, the thrust collar 11 is fixed on the shaft 8 and the frame 16 is placed in position, supported at the lower end on the bosses 22 and 23 and held at the upper end by the spaced fingers 26. Suitable shims may be located between the bosses 22 and 23 and the cross plate 20 to bring the frame to the correct height. Suitable bolts 68 are then put into place passing down through openings in the base plate 20 into the bosses 23. The holes in the base plate 20 through which the bolts 68 pass are made slightly larger than the bolts to leave a limited amount of play. The lower halves of the thrust bearing plates 43 and 44 are then bolted to the ring 13 and the frame 16 is turned on its vertical axis until the lower halves of the thrust plates 43 and 44 are brought parallel with the thrust collar 11. The slight movement necessary for this is taken care of by the bolt holes for bolts 68 being over size. When brought to the correct position, the bolts 68 are tightened and a hole drilled in base plate 20 and boss 23 to receive a dowel pin 69. The upper halves of the thrust plates 43 and 44 are then bolted into place and the other parts assembled. The thrust bearing can now be adjusted longitudinally to bring the shaft and packing to correct position by turning the screw rod 34 by means of a wrench applied to the end 40. This, as already explained, will run the block 30 along the rod and move the frame 16 on trunnions 19. In adjusting the shaft longitudinally the important thing is to get the correct clearance for the packing where a packing of the labyrinth type is employed. With the present arrangement the threaded rod 34 can be turned in the one direction to just bring the parts of the packing into engagement and then turned in the opposite direction to get the desired clearance, the amount being indicated by the measuring or indicating mechanism 40, 41.

By the above described arrangement it will be seen that a thrust bearing is provided which is simple in structure and which may be readily adjusted on both a vertical and horizontal axis. In other words, the thrust bearing is supported substantially on a universal or gimbal joint.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a thrust bearing, the combination of a shaft, a thrust collar fixed thereon, thrust plates adapted to be engaged by the collar, a member which carries both said plates, and means for adjusting said members on a vertical and a horizontal axis.

2. In a thrust bearing, the combination of a shaft, a thrust collar fixed thereon, a ring surrounding the collar, thrust plates carried by said ring, a frame surrounding said ring and provided with bearings in which said ring is pivotally supported, and means supporting said frame whereby it may be turned on both a horizontal and vertical axis.

3. In a thrust bearing, the combination of a shaft, a thrust collar fixed thereon, a ring surrounding the thrust collar, thrust plates carried by said ring, said thrust plates being split in a horizontal plane, trunnions on said ring, and a frame having bearings in which said trunnions are pivoted, said frame comprising a cross plate pivotally supported on a vertical axis, and arms pivoted on said cross plate to turn on a horizontal axis.

4. In a thrust bearing, the combination of a shaft, a thrust collar fixed thereon, a ring surrounding the thrust collar, thrust plates carried by said ring, trunnions on said ring, a cross plate located beneath said ring and supported to turn on a vertical axis, a U-shaped member pivoted to said cross plate to swing on a horizontal axis and having bearings for said trunnions, and adjustable means for holding the upper end of said U-shaped member.

5. In a thrust bearing, the combination of a shaft, a thrust collar fixed thereon, a ring surrounding the thrust collar, thrust plates carried by said ring, trunnions on said ring, a cross plate located beneath said ring and supported to turn on a vertical axis, a U-shaped member pivoted to said cross plate to swing on a horizontal axis and having bearings for said trunnions, adjustable means for holding the upper end of said U-shaped member, comprising a threaded rod held against longitudinal movement, a block having a threaded opening through which the rod passes, and means connecting the U-shaped member to said block whereby when said rod is turned the block will be run along it.

In witness whereof, I have hereunto set my hand this 4th day of June, 1917.

OSCAR JUNGGREN.